(12) United States Patent
Tomlinson et al.

(10) Patent No.: US 6,397,575 B2
(45) Date of Patent: Jun. 4, 2002

(54) APPARATUS AND METHODS OF REHEATING GAS TURBINE COOLING STEAM AND HIGH PRESSURE STEAM TURBINE EXHAUST IN A COMBINED CYCLE POWER GENERATING SYSTEM

(75) Inventors: Leroy Omar Tomlinson, Niskayuna; Raub Warfield Smith, Ballston Lake, both of NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/533,194

(22) Filed: Mar. 23, 2000

(51) Int. Cl.[7] .............................. F02C 6/18; F02C 7/12
(52) U.S. Cl. .................................. 60/39.02; 60/39.182
(58) Field of Search .......................... 60/39.02, 39.182

(56) References Cited

U.S. PATENT DOCUMENTS

| | | | | |
|---|---|---|---|---|
| 4,424,668 A | * | 1/1984 | Mukherjee | 60/39.182 |
| 4,896,499 A | * | 1/1990 | Rice | 60/39.182 |
| 5,428,950 A | | 7/1995 | Tomlinson et al. | 10/39.182 |
| 5,491,971 A | * | 2/1996 | Tomlinson et al. | 60/39.182 |
| 5,577,377 A | * | 11/1996 | Tomlinson | 60/39.182 |
| 6,038,850 A | * | 3/2000 | Ohtomo et al. | 60/39.182 |
| 6,109,019 A | * | 8/2000 | Sugishita | 60/39.182 |
| 6,116,017 A | * | 9/2000 | Mori et la. | 60/39.182 |

OTHER PUBLICATIONS

"39th GE Turbine State–of–the–Art Technology Seminar", Tab 1, "F" Technology –the First Half–Million Operating Hours, H. E. Miller, Aug. 1996.
"39th GE Turbine State–of–the–Art Technology Seminar", Tab 2, "GE Heavy–Duty Gas Turbine Performance Characteristics", F. J. Brooks, Aug. 1996.
"39th GE Turbine State–of–the–Art Technology Seminar", Tab 3, "9EC 50Hz 170–MW Class Gas Turbine", A. S. Arrao, Aug. 1996.
"39th GE Turbine State–of–the–Art Technology Seminar", Tab 4, "MWS6001FA –An Advanced–Technology 70–MW Class 50/60 Hz Gas Turbine", Ramachandran et al., Aug. 1996.
"39th GE Turbine State–of–the–Art Technology Seminar", Tab 5, "Turbomachinery Technology Advances at Nuovo Pignone", Benvenuti et al., Aug. 1996.
"39th GE Turbine State–of–the–Art Technology Seminar", Tab 6, "GE Aeroderivative Gas Turbines –Design and Operating Features", M. W. Horner, Aug. 1996.
"39th GE Turbine State–of–the–Art Technology Seminar", Tab 7, "Advance Gas Turbine Materials and Coatings", P. W. Schlike, Aug. 1996.

(List continued on next page.)

*Primary Examiner*—Ted Kim
(74) *Attorney, Agent, or Firm*—Nixon & Vanderhye

(57) ABSTRACT

In a combined cycle system having a multi-pressure heat recovery steam generator, a gas turbine and steam turbine, steam for cooling gas turbine components is supplied from the intermediate pressure section of the heat recovery steam generator supplemented by a portion of the steam exhausting from the HP section of the steam turbine, steam from the gas turbine cooling cycle and the exhaust from the HP section of the steam turbine are combined for flow through a reheat section of the HRSG. The reheated steam is supplied to the IP section inlet of the steam turbine. Thus, where gas turbine cooling steam temperature is lower than optimum, a net improvement in performance is achieved by flowing the cooling steam exhausting from the gas turbine and the exhaust steam from the high pressure section of the steam turbine in series through the reheater of the HRSG for applying steam at optimum temperature to the IP section of the steam turbine.

7 Claims, 2 Drawing Sheets

OTHER PUBLICATIONS

"39th GE Turbine State–of–the–Art Technology Seminar", Tab 8, "Dry Low $NO_x$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines," J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program –Conceptual Design and Product Development", Annual Report, Sep. 1, 1994 – Aug. 31, 1995.

"Advanced Turbine Systems (ATS Program) Conceptual Design and Product Development", Final Technical Progress Report, vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993 –Aug. 31, 1994.

"Advanced Turbine Systems" Annual Program Review, Preprints, Nov. 2–4, 1998, Washington, D. C. U. S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Numbers DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18. May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/ pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C. Publication Release.

"H Technology Commercialization", 1998 MarComm Activity Recommendation, Mar. 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency for GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century –"H" Gas Turbine Combined Cycles", Thomas C. Paul et al., Report,.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D. W. Esbeck, pp. 3–13, Oct. 1995.

"Proceedings of the Advanced Turbine Systems Annual Program Review Meeting", vol. I, "H"Gas Turbine Combined Cycle, J. Corman, pp. 14–21, Oct. 1995.

"Proceedings of the Advanced Turbine Systems Annual Program Review Meeting", vol. I, "Overview of Westinghouse's Advanced Turbine Systems Program", Bannister et al., pp. 22–30, Oct. 1995.

"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates pp. 43–63, Oct. 1995.

"Proceedings of the Advanced Turbine Systems Annual Program Review Meeting", vol. I, "Advanced Turbine System Program Phase 2 Cycle Selection, Latcovich", Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systems Program", Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al., pp.87–88, Oct., 1995.

"Proceedings of the Advanced Turbine Systems Annual Program Review Meeting", vol. I, "Advanced Turbine Systems Annual Program Review", William E. Koop pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/ AGTSR Interactions", Sy A. Ali pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147 Oct., 1995.

"Proceedings of the Advanced Turbine Systems Annual program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al., pp. 233–248, Oct., 1995.

"Proceedings of the Advanced Turbine Systems Annual Program Review Meeting", vol. II, "Lean Premixed Flames for Low $NO_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. I, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_x$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application", Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535,–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS'"s , Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's, Advanced Turbine systems Program", facsimile dated Nov. 7, 1996.

"Testing Program Results Validate GE's H Gas Turbine – High Efficiency, Low Cost of Electricity and Low Emissions", Roger Schonewald and Patrick Marolda, (no date available),.

"Testing Program Results Validate GE's H Gas Turbine – High Efficiency, Low Cost of Electricity and Low Emissions", Slide Presentation –working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Numbers: DOE/MC/31176—5628,.

"Utility Advanced Turbine System (ATS) Technology Readiness Testing —Phase 3", Document #666274, Oct. 1, 1996–Sep. 30, 1997, Publication Date, Dec. 31, 1997, Report Numbers: DOE/MC/31176—10.

"Utility Advanced Turbine System (ATS) Technology Readiness Testing and Pre–Commercial Demonstration, Phase 3", Document #486029, Oct. 1 –Dec. 31, 1995, Publication Date, May 1, 1997, Report Numbers: DOE/MC/31176–5340.

"Utility Advanced Turbine System (ATS) Technology Readiness Testing and Pre–Commercial Demonstration –Phase 3", Document #486132, Apr. 1 –Jun. 30, 1976, Publication Date, Dec. 31, 1996, Report Numbers: DOE/MC/31176–5660.

"Utility Advanced Turbine System (ATS) Technology Readiness Testing and Pre–Commercial Demonstration –Phase 3", Document #587906, Jul. 1 –Sep. 30, 1995, Publication Date, Dec. 31, 1995, Report Numbers: DOE/MC/31176–5339.

"Utility Advanced Turbine System (ATS) Technology Readiness Testing and Pre–Commercial Demonstration" Document #666277, Apr. 1 –Jun. 30, 1997, Publication Date, Dec. 31, 1997, Report Numbers: DOE/MC/31176–8.

"Utility Advanced Turbine System (ATS) Technology Readiness Testing and Pre–Commercialization Demonstration" Jan. 1 –Mar. 31, 1996, DOE/MC/31176—5338.

"Utility Advanced Turbine System (ATS) Technology Readiness Testing: Phase 3R", Document #756552, Apr. 1 –Jun. 30, 1999, Publication Date, Sep. 1, 1999, Report Numbers: DE—FC21–95MC31176–23.

"Utility Advanced Turbine System (ATS) Technology Readiness Testing.", Document #656823, Jan. 1 –Mar. 31, 1998, Publication Date, Aug. 1, 1998, Report Numbers: DOE/MC/31176–17.

"Utility Advanced Turbine Systems (ATS) Technology Readiness Testing and Pre–Commercial Demonstration", Annual Technical Progress Report, Reporting Period: Jul. 1, 1995 –Sep. 30, 1996.

"Utility Advanced Turbine Systems (ATS) Technology Readiness Testing", Phase 3R, Annual Technical Progress Report, Reporting Period: Oct. 1, 1997 –Sep. 30, 1998.

"Utility Advanced Turbine Systems (ATS) Technology Readiness Testing", Document #750405, Oct. 1 –Dec. 30, 1998, Publication Date: May, 1, 1999, Report Numbers: DE–FC21–95MC31176–20.

"Utility Advanced Turbine Systems (ATS) Technology Readiness Testing", Document #1348, Apr. 1 –Jun. 29, 1998, Publication Date Oct. 29, 1998, Report Numbers DE–FC21–95MC31176—18.

"Utility Advanced Turbine Systems (ATS) Technology Readiness Testing –Phase 3", Annual Technical Progress Report, Reporting Period: Oct. 1, 1996 –Sep. 30, 1997.

"Utility Advanced Turbine Systems (ATS) Technology Readiness Testing and Pre–Commercial Demonstration", Quarterly Report, Jan. 1 –Mar. 31, 1997, Document #666275, Report Numbers: DOE/MC/31176–07.

"Proceedings of the 1997 Advanced Turbine Systems", Annual Program Review Meeting, Oct. 28–29, 1997.

* cited by examiner

APPARATUS AND METHODS OF REHEATING GAS TURBINE COOLING STEAM AND HIGH PRESSURE STEAM TURBINE EXHAUST IN A COMBINED CYCLE POWER GENERATING SYSTEM

This invention was made with Government support under Contract No. DE-FC21-95MC31176 awarded by the Department of Energy. The Government has certain rights in this invention.

BACKGROUND OF THE INVENTION

The present invention relates to a combined cycle land-based power generating system in which the heat content of the exhaust gases from the gas turbine is recovered in a heat recovery steam generator for heating steam for expansion through the steam turbine, The invention particularly related to reheating spent cooling steam from the gas turbine and exhaust steam from the HP steam turbine outlet in the heat recovery steam generator for use in the IP steam turbine.

In prior combined cycle power generating systems, hot component parts of the gas turbine are cooled by introducing a fluid medium, for example, cooling steam, from the intermediate pressure section of the heat recovery steam generator supplemented by steam exhausting from the steam turbine into the gas turbine. Typically, cooling steam is provided from the intermediate pressure section of the heat recovery steam generator supplemented by a controlled portion of the steam from the exhaust from the HP section of the steam turbine only to the extent the steam is needed to cool the component parts of the gas turbine. The balance of the steam from the steam turbine HP section not needed for cooling purposes in the gas turbine is conventionally forwarded to the reheat section of the heat recovery steam generator for reheating. The energy for reheating the unneeded steam from the steam turbine is obtained from the exhaust gases of the gas turbine flowing through the heat recovery steam generator. The reheated steam is then typically combined with the spent cooling steam from the gas turbine for flow into the inlet of another portion of the steam turbine, e.g., the intermediate pressure (IP) steam turbine inlet.

The system described above is set forth in U.S. Pat. No. 5,428,950, of common assignee herewith. At that time, the cooling cycle duty and steam flow was believed sufficient to provide a mix of spent cooling steam from the gas turbine and the reheat steam at a temperature at or near the required inlet temperature for the IP steam turbine section for optimum performance. Increased steam cooling steam flow requirements of the gas turbine, however, have significantly and substantially reduced the temperature of the mix of spent cooling steam exiting the gas turbine and the reheat steam exiting the heat recovery steam generator to a temperature well below the optimum temperature of the steam supplied to the IP steam turbine inlet. With this reduced temperature of the mix, reduced performance of the combined cycle system results. It is this performance penalty which the present invention addresses.

BRIEF SUMMARY OF THE INVENTION

In accordance with a preferred embodiment of the present invention, and in a combined cycle system where the temperature of the mix of spent cooling steam exiting the gas turbine is significantly lower than the optimum temperature of the steam at the IP steam turbine inlet, the spent cooling steam and exhaust steam from the HP steam turbine section are combined for flow through the reheat section of the heat recovery steam generator prior to delivery to the IP steam turbine inlet. It will be appreciated that the parallel flow arrangement of heat recovery in the aforementioned prior system disclosed in U.S. Pat. No. 5,428,950, i.e., (i) recovering heat from the exhaust gases of the gas turbine in the reheat section to reheat the exhaust steam from the HP section of the steam turbine, and (ii) generating heat from steam cooling the hot component parts of the gas turbine to provide heated spent cooling steam and combining the reheated exhaust steam and the spent cooling steam for flow to the IP section of the steam turbine is penalized by the greater of the pressure drops of the parallel flow paths. Consequently, if the steam temperature of the mix is comparable to or even slightly below the desired inlet temperature to the IP section of the steam turbine, the parallel arrangement is advantageous. However, as the cooling steam flow requirements increase for the gas turbine, the temperature of the mix of spent cooling steam and reheat steam becomes significantly and substantially lower than the desired input temperature to the IP steam turbine. In accordance with a preferred embodiment, a series arrangement for the reheat and spent cooling steam is provided to raise the temperature of the mix of steam provided to the IP section of the steam turbine. Moreover, a net increase in combined cycle performance is obtained by mixing the spent cooling steam and HP steam turbine exhaust for combined passage through the reheat section of the HRSG to substantially maintain the desired steam temperature at the intermediate pressure turbine inlet when the steam cooling flow requirements are high. The pressure loss caused by the combined pressure drops through the gas turbine and reheater, when the spent cooling steam and HP section exhaust steam are combined in series and pass through the reheater of the heat recovery steam generator, comprise the penalty for maintaining the mixed steam at the IP inlet of the steam turbine at the desired temperature. However, where the steam cooling requirements of the gas turbine are substantial and there is a consequential substantial reduction in temperature of the mixed cooling steam and reheat steam at the IP inlet of the steam turbine, the combined cycle system employing series reheat rather than the parallel reheat as set forth in the prior U.S. Pat. No. 5,428,950 affords improved overall performance.

In a preferred embodiment according to the present invention, there is provided in a combined cycle system including a gas turbine, a steam turbine and a heat recovery steam generator wherein gas turbine exhaust is used in the heat recovery steam generator for heating steam for the steam turbine, a method of operating the combined cycle system comprising the steps of supplying steam from the intermediate pressure section of the heat recovery steam generator to the gag turbine to cool component parts thereof, supplementing the steam from the intermediate pressure section of the heat recovery steam generator by supplying a first portion of steam from a high pressure section of the steam turbine to the gas turbine to cool component parts thereof, combining spent cooling steam from the gas turbine and a second portion of steam from the high pressure section of the steam turbine, reheating the combined spent cooling steam and the second steam portion in the heat recovery steam generator and flowing the reheated combined spent cooling steam and the second steam portion to an intermediate pressure section of the steam turbine.

In a further preferred embodiment according to the present invention, there is provided a method of operating a combined cycle system comprising the steps of supplying steam from an intermediate pressure section of a heat recovery steam generator to a gas turbine to cool component parts thereof, supplementing the steam from the intermediate pressure section of the heat recovery steam generator by supplying a first portion of cooling steam from an ancillary steam turbine to the gas turbine for cooling component parts thereof, combining a second portion of cooling steam from the ancillary turbine and spent cooling steam from the gas turbine for flow through the heat recovery generator heated by exhaust gases from the gas turbine and flowing the heated combined cooling steam to another section of the ancillary turbine.

In a still further preferred embodiment according to the present invention, there is provided a combined cycle system comprising a gas turbine, a steam turbine and a multi-pressure heat recovery steam generator wherein gas turbine exhaust gas is used in the heat recovery steam generator for reheating steam for the steam turbine, a supply passage for supplying gas turbine cooling duty steam from an intermediate pressure section of the heat recovery steam generator supplemented by a portion of the steam exhausting from a high pressure section of the steam turbine to the gas turbine for cooling turbine parts, a first passage in communication with the high pressure steam turbine section for supplying the supplemental steam portion to the supply passage, a reheater in the heat recovery steam generator, a second passage for flowing spent cooling steam from the gas turbine to the reheater, a third passage for flowing another portion of steam exhausted from the high pressure turbine section to the reheater, the spent cooling steam and exhaust steam being combined for flow through the reheater and a fourth passage in communication with the reheater and the intermediate pressure section of the steam turbine for flowing the reheated combined steam flows exiting the reheater to the intermediate pressure section of the steam turbine.

DETAILED DESCRIPTION OF THE INVENTION

Figure 1:
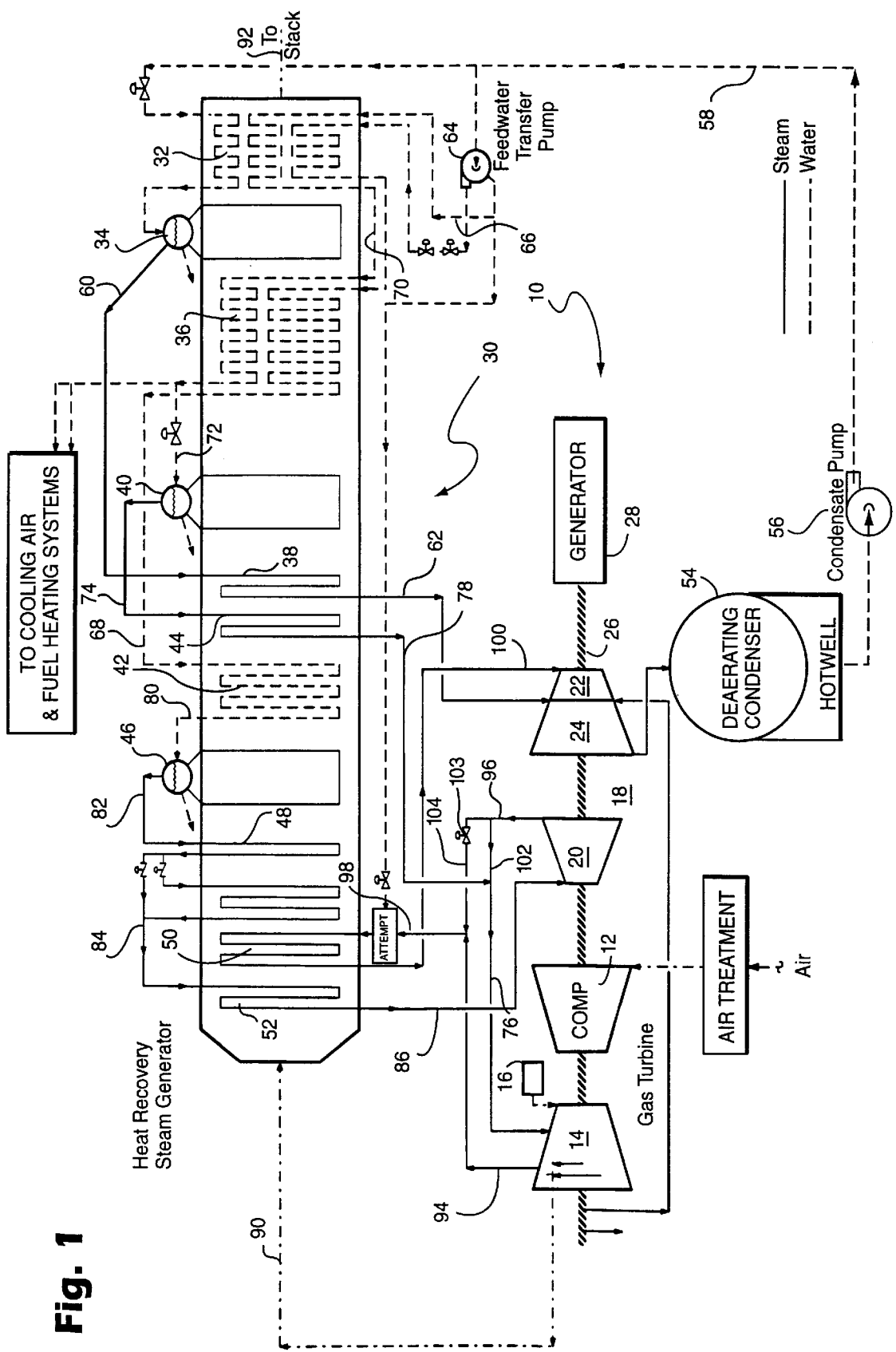
FIG. 1 is a schematic flow diagram of a multi-pressure reheat combined cycle system with a steam cooled gas turbine employing series reheat in accordance with a preferred embodiment of the present invention.

Referring now to FIG. 1, there is illustrated a combined cycle power generation system, generally designated 10. The gas turbine portion of the combined cycle system 10 includes a compressor 12, a turbine section 14 and a combustion system 16. The steam turbine portion of the combined cycle system includes a steam turbine 18 having high pressure (HP), intermediate pressure (IP) and low pressure (LP) sections 20, 22 and 24, respectively. As schematically illustrated, the gas turbine and steam turbine are connected one to the other on a common shaft 26 for driving a generator 28. Multiple shaft arrangements and multiple generators can also be employed.

The steam turbine system 18 includes an unfired, multi-pressure heat recovery steam generator (HRSG), generally designated 30. The HRSG 30 includes an LP economizer 32, an LP evaporator 34, an HP and IP economizer 36, a low pressure superheater 38, an IP evaporator 40, an HP economizer 42, an IP superheater 44, an HP evaporator 46, a first HP superheater 48, an HP reheater 50 and a second HP superheater 52, all of which is conventional.

Steam exhausting from the low pressure steam turbine section 24 is condensed in a condenser 54 and the condensate is supplied via a pump 56 and conduit 58 to the HRSG 30. The condensate passes through the LP economizer 32 and into the LP evaporator 34. Steam from the low pressure evaporator 34 is fed to the LP superheater 38 via conduit 60 and then returned to the low pressure section 24 of the steam turbine 18 via conduit 62. Feed water is pumped by a pump 64 through the LP evaporator 34 and the HP and IP economizer 36 by way of a conduit 66 and then to the HP economizer 42 via conduit 68; and through the HP and IP economizer 36 via conduit 70 and then to the IP evaporator 40 via conduit 72.

Steam from the IP evaporator 40 passes through the IP superheater 44 via conduit 74 and is then passed to a steam cooling duty conduit 76 via conduit 78. As noted below, the steam from the IP superheater 44 combines with a portion of the exhaust steam in conduit 102 from the high pressure section 20 of the steam turbine in the steam cooling duty conduit 76. Thus, conduits 76 and 78 form a supply passage for supplying gas turbine cooling duty steam from intermediate pressure section 44 and conduits 96 and 102 form a first passage in communication with the HP turbine section 20 for supplying supplemental steam to the supply passage 76, 78.

Condensate in the HP economizer 42 is passed to the HP evaporator 46 via conduit 80. Steam exiting the HP evaporator 46 via conduit 82 passes through the first superheater 48 and then through the second superheater 52 via conduit 84. Superheated steam from superheater 52 is then returned to the high pressure section 20 of the steam turbine 18 via conduit 86. As well known, heat is provided to the HRSG 30 by the exhaust gases from the gas turbine 14 introduced into the HRSG via conduit 90. Those exhaust gases exit the HRSG 30 via a stack 92.

As illustrated, the cooling steam conduit 76 is supplied with steam from the IP superheater 44 and a portion of the exhaust from the high pressure section 20 of the steam turbine 18 via conduits 96 and 102. The heated cooling steam exiting the gas turbine section 14 via conduit or second passage 94 combines with a portion of the steam exiting the high pressure section 20 of steam turbine 18 via conduit or third passage 104 for combined flow to the reheater 50 of the HRSG via conduit 98. The portion of steam exhausting from the HP section 20 of the steam turbine that is supplied to the cooling steam through conduit 102 is modulated by the bypass control valve 103 in conduit 104. The reheated steam from reheater 50 is supplied via conduit or fourth passage 100 to the inlet of the IP section 22 of the steam turbine 18. Thus, instead of a parallel arrangement in which cooling steam heated by the gas turbine and reheated exhaust steam from the HP section of the steam turbine are combined for input to the IP section of the steam turbine, the IP section of the steam turbine is provided with steam in series from the combined spent cooling steam and the HP steam turbine exhaust steam passed through the reheater 50.

Figure 2:
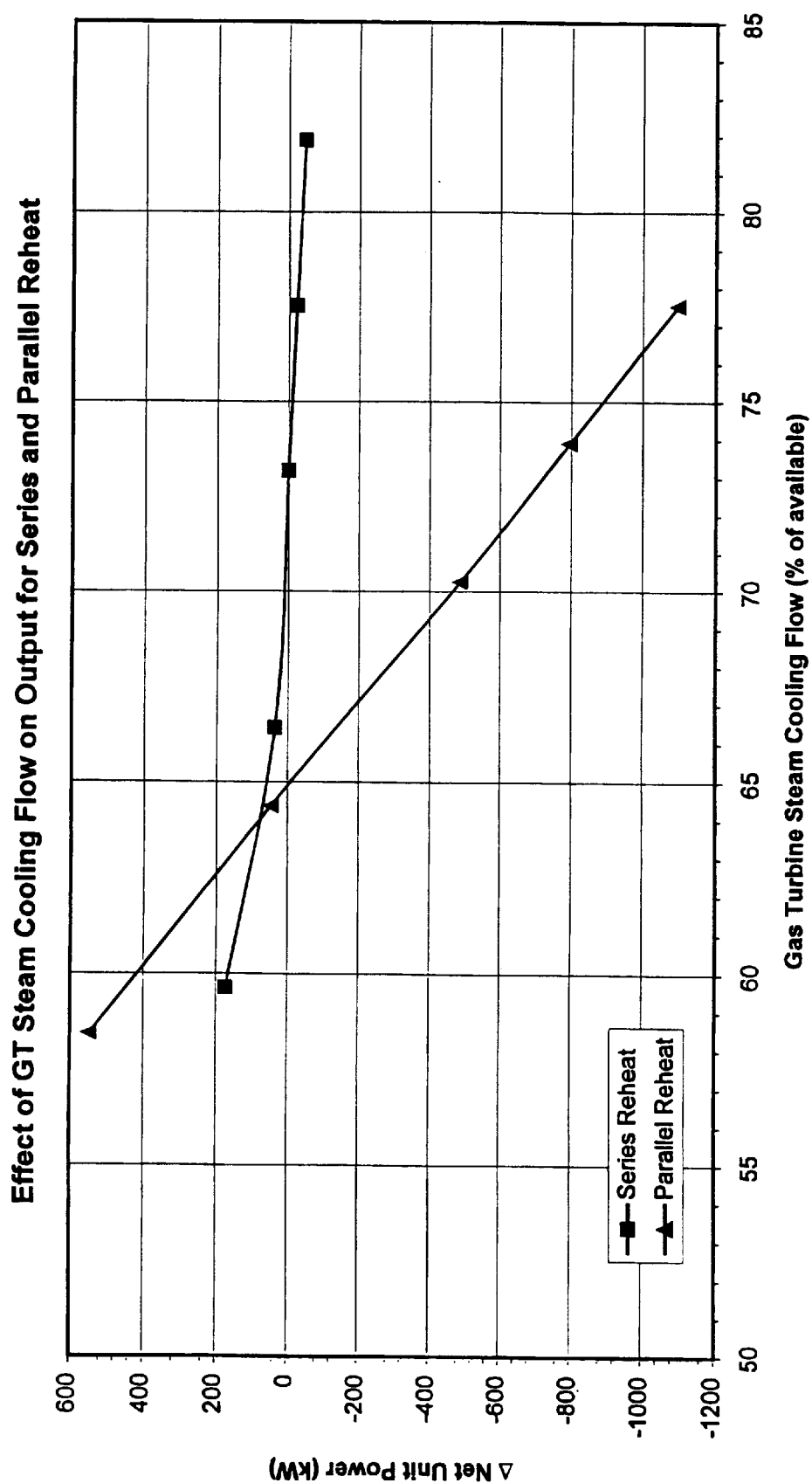
FIG. 2 is a chart illustrating a comparison of series and parallel reheat as a function of net power.

As a consequence of this series arrangement and instead of the parallel arrangement, a net performance gain is achieved by substantially maintaining the desired steam temperature to the IP steam turbine inlet by passing the spent cooling steam and HP turbine exhaust steam in combination through the reheater and accepting the higher pressure drop penalty. This increase in net performance is graphically illustrated with reference to FIG. 2 which presents a performance comparison for a typical combined cycle unit with a steam cooled gas turbine in which the gas turbine cooling duty is constant and cooling steam flow is varied. It can be seen that where the steam cooling duty requirement is less than, e.g., about 64% of the exhaust from the HP section of the steam turbine, a parallel arrangement of steam delivery to the IP steam turbine as disclosed in the prior U.S. Pat. No. 5,428,950 is advantageous. However, when increased cooling steam flow or reduced gas turbine cooling duty reduces the temperature of steam discharged from the gas turbine such that the temperature of the steam supplied to the intermediate pressure section of the steam turbine is lower than that required for optimum performance, net power output is improved by maintaining the steam temperature to the IP section inlet of the steam turbine at a desired level and accepting the higher pressure drop penalty by using the series reheat of the present invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a combined cycle system including a gas turbine, a steam turbine and a heat recovery steam generator having a reheater and an inlet to the reheater and wherein gas turbine exhaust is used in the heat recovery steam generator for heating steam for the steam turbine, a method of operating the combined cycle system comprising the steps of:

supplying steam from the intermediate pressure section of the heat recovery steam generator to the gas turbine to cool component parts thereof;

supplementing the steam from the intermediate pressure section of the heat recovery steam generator by supplying a first portion of steam from a high pressure section of the steam turbine to the gas turbine to cool component parts thereof;

combining spent cooling steam from said gas turbine and a second portion of steam from the high pressure section of the steam turbine;

supplying the combined spent cooling steam and second steam portion to the inlet for the reheater of the heat recovery steam generator;

reheating the combined spent cooling steam and said second steam portion in said reheater of said heat recovery steam generator; and flowing the reheated combined spent cooling steam and said second steam portion to an intermediate pressure section of the steam turbine.

2. A method according to claim 1 including flowing steam from a high pressure superheater in the heat recovery steam generator to an inlet for the high pressure turbine.

3. A method according to claim 1 including controlling the flow of the supplemental steam supplied from the high pressure section of the steam turbine to the gas turbine.

4. A method of operating a combined cycle system comprising the steps of:

supplying steam from an intermediate pressure section of a heat recovery steam generator to a gas turbine to cool component parts thereof;

supplementing the steam from the intermediate pressure section of the heat recovery steam generator by supplying a first portion of cooling steam from an ancillary steam turbine to the gas turbine for cooling component parts thereof;

combining a second portion of cooling steam from the ancillary turbine and spent cooling steam from the gas turbine;

supplying the combined second coling steam portion and spent cooling steam to an inlet to a reheater for reheating thereof in the heat recovery steam generator by exhaust gases from the gas turbine; and flowing the heated combined cooling steam to another section of the ancillary turbine.

5. A method according to claim 4 including controlling the flow of the supplemental steam supplied from the ancillary steam turbine to the gas turbine.

6. A combined cycle system comprising: a gas turbine, a steam turbine exhaust gas is used in the heat recovery steam generator for reheating steam for the steam turbine;

a supply passage for supplying gas turbine cooling duty steam from an intermediate pressure section of said heat recovery steam generator supplemented by a portion of the steam exhausting from a high pressure section of the steam turbine to the gas turbine for cooling turbine parts;

a first passage in communication with said high pressure steam turbine section for supplying the supplemental steam portion to said supply passage;

a reheater in said heat recovery steam generator;

a second passage for flowing spent cooling steam from said gas turbine to said reheater;

a third passage for flowing another portion of steam exhausted from said high pressure turbine section to said reheater;

a juncture of said second and third passages external to said heat recovery steam generator for combining the spent cooling steam and exhaust steam and flowing the combined spent cooling steam and exhaust steam through the reheater; and a fourth passage in communication with said reheater and said intermediate pressure section of the steam turbine for flowing the reheated combined steam flows exiting the reheater to said intermediate pressure section of the steam turbine.

7. A system according to claim 6 wherein said first passage and said third passage are in communication with one another, and a bypass control valve in said third passage for modulating the flow of steam along said first passage.

* * * * *

UNITED STATES PATENT AND TRADEMARK OFFICE
CERTIFICATE OF CORRECTION

PATENT NO.   : 6,397,575 B2
DATED        : June 4, 2002
INVENTOR(S)  : Tomlinson et al.

It is certified that error appears in the above-identified patent and that said Letters Patent is hereby corrected as shown below:

Column 1,
Line 18, delete "turbine, The invention particularly related" and insert -- turbine. The invention particularly relates --.

Column 2,
Line 53, delete "gag" and insert -- gas --.

Column 6,
Line 24, before "turbine" insert -- turbine and a multi-pressure heat recovery steam generator wherein gas --.

Signed and Sealed this

Twenty-second Day of October, 2002

Attest:

JAMES E. ROGAN
Attesting Officer    Director of the United States Patent and Trademark Office